Figure 1:
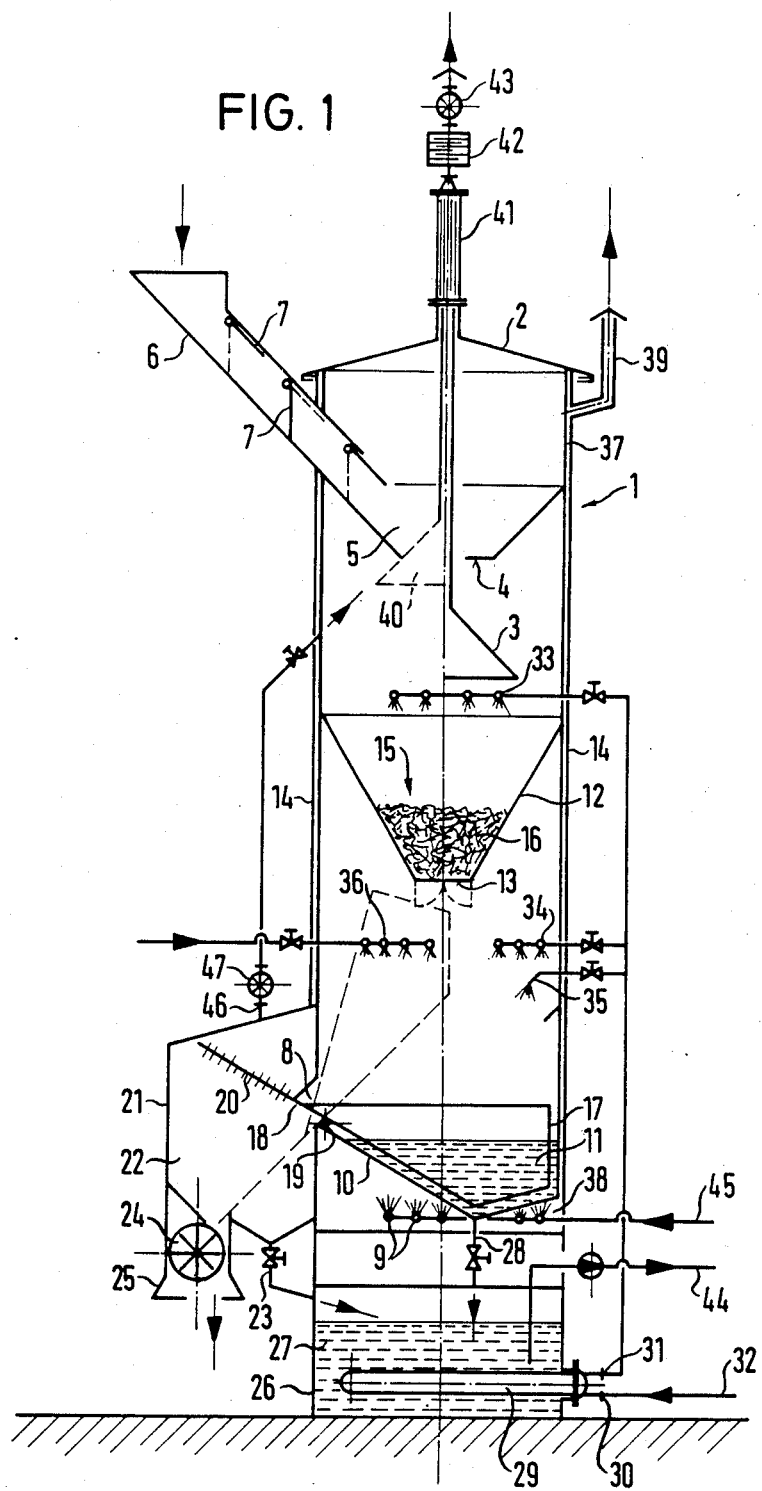

United States Patent [19]

Fuchs et al.

[11] Patent Number: 4,614,752
[45] Date of Patent: Sep. 30, 1986

[54] PROCESS AND APPARATUS FOR REMOVING RUBBER AND/OR PLASTIC MATERIAL FROM COMPOSITE BODIES COMPRISING METAL AND AT LEAST ONE OF SAID MATERIALS

[75] Inventors: Gerhard Fuchs, Kehl-Bodersweier; Roland R. Hertenstein, Lahr; Hans G. Quick, Ahrensburg, all of Fed. Rep. of Germany

[73] Assignee: Fuchs Recycling GmbH & Co., Willstatt-Legelshurst, Fed. Rep. of Germany

[21] Appl. No.: 746,343

[22] Filed: Jun. 19, 1985

[30] Foreign Application Priority Data

Jun. 20, 1984 [DE] Fed. Rep. of Germany ....... 3422924

[51] Int. Cl.⁴ .......................... C08J 11/04; C08J 11/08
[52] U.S. Cl. .................................... 521/44.5; 521/41; 521/46; 521/46.5
[58] Field of Search ...................... 521/41, 44.5, 46.5, 521/46

[56] References Cited

U.S. PATENT DOCUMENTS

| | | | |
|---|---|---|---|
| 2,794,057 | 5/1957 | Gunther | 521/44.5 |
| 3,666,691 | 5/1972 | Spiller | 521/46.5 |
| 3,836,486 | 9/1974 | Hafner | 521/46.5 |
| 3,912,664 | 10/1975 | Wainer | 521/46.5 |
| 4,071,479 | 1/1978 | Broyde et al. | 521/46.5 |

FOREIGN PATENT DOCUMENTS

| | | | |
|---|---|---|---|
| WO83/02281 | 7/1983 | PCT Int'l Appl. | 521/44.5 |
| 100961 | 7/1917 | United Kingdom | 521/44.5 |
| 147628 | 5/1921 | United Kingdom | 521/44.5 |

*Primary Examiner*—Allan M. Lieberman

[57] ABSTRACT

A process and apparatus for removing the non-metallic components from composite bodies of metal and rubber and/or plastic, which occur as waste. The composite bodies are heated in a preheating zone and then dipped into a heated solvent or exposed to the vapors of said solvent.

4 Claims, 3 Drawing Figures

PROCESS AND APPARATUS FOR REMOVING RUBBER AND/OR PLASTIC MATERIAL FROM COMPOSITE BODIES COMPRISING METAL AND AT LEAST ONE OF SAID MATERIALS

DESCRIPTION

The invention relates to a process and an apparatus for removing rubber and/or plastic material from composite bodies comprising metal and at least one of said materials.

Processes and apparatuses of that kind are used for removing the non-metallic components from composite bodies which occur as waste and which comprise metal and rubber and/or plastic material, and passing the separated components to a recycling process. Composite bodies of that kind may be metal members which are completely or partially coated with rubber and/or plastic material or rubber and plastic members which are reinforced with metal members or which are compounded with metal, for example caterpillar track members, rollers, machine components, chain pads, cable scrap, computer scrap, carpet floors, and so forth.

For the purposes of removing rubber from rubberised metal members which occur as waste and for re-utilisation of the metal members recovered it is known for the rubber to be detached by means of a high frequency treatment or to be rendered brittle by means of cooling agents and then removed mechanically. Such processes are in part expensive and, in the case of the high frequency separation process, give rise to environmental pollution due to the gases which are produced. Finally, some of the known processes require a comparatively long period of operation.

An object of the present invention is to provide a process and an apparatus with which the non-metallic components can be removed economically and without causing environmental pollution from composite bodies which comprise metal and rubber, and/or plastic materials and which occur as waste, and the separated components can be passed on for re-utilisation thereof. The invention further seeks to provide that the duration of the process can be kept short, in spite of the metal members being handled carefully.

In one aspect of the process, the composite bodies are firstly exposed to the hot vapours of the solvent in a preheating zone of the reaction container, and thereby heated to a temperature of from 50° to 150° C. In that operation, the composite bodies are carefully heated through and through and the bond between the metal and the rubber or plastic material is reduced. The heated composite bodies are then dipped into the heated solvent, the temperature of which is set to a value of from 150° to 550°C., preferably from 150° to 350° C. Here, the non-metallic components are separated and dissolved within a period of a few minutes. The treatment operation in the reaction container takes place at an atsolute gas pressure in the range of from 0.5 to 4.0 bars, preferably from 0.5 to 2.0 bars, while it has been found to be advantageous for the process to be carried out under a reduced pressure as in that case, due to evaporation of the solvent at a relatively low temperature, separation of the rubber and plastic material from the metal already occurs at a temperature below 200° C. so that sensitive metals do not suffer from any damage due to high temperature. A substantial proportion of the hot solvent vapours condense upon preheating of the composite bodies, the remainder is recovered in a condensation installation which is disposed at a downstream location and can be recycled to the process after addition of the consumed substances, by way of a spray device. Ihat mode of operation makes almost complete use of the sensible heat in direction heat exchange relationship with the composite bodies in the preheating zone and also in the indirect heat exchange relationship of a condensation installation which is disposed at a downstream location, thus providing an economical process. At the same time, noxious gases from the solvent are prevented from escaping into the atmosphere. In addition, the existence of the preheating zone makes it possible to provide for careful temperature control with a short operating period for the process of separating and dissolving the non-metallic ccmponents.

The solvents used may be known solvents for plastic material and/or rubber respectively. Advantageous forms of solvents are solvents based on mineral oils with suitable additives or a heated trichloroethylene bath.

In another aspect of the process, the composite bodies, after the preheating step, are only treated in the gaseous phase of the solvent. The preheating operation is effected by means of hot air or the hot waste gases from the heating means, which cause the solvent to be put into the gaseous phase. That process generally only provides for separating or breaking up the bond between the metallic and non-metallic components, but it does not provide for dissolving the non-metallic components. In many cases however, for example in the of rubber-coated rollers, that is sufficient because, after such a treatment, the layer of rubber may be easily removed from the metal member.

The metal members recovered, after the usual preliminary treatment (sand blasting, pickling, etc.), may be passed to a fresh rubberising or coating process or, where re-utilisation is not possible, they may be used as high-quality scrap in the production of new metal members.

The rubber and plastic components which are dissolved in the solvent bath in the process first referred to above, in conjunction with the residual solvent, produce a viscose mass with a proportion of 65 to 70% rubber and/or plastic material. That mass is combustible and can be used as a fuel or also as a partial substitute for bitumen as a binder in the production of asphalt.

The apparatus for carrying out the process includes a reaction zone in or above the solvent bath which is disposed in a heatable tank or trough, and a preheating zone above or beside the tank or trough. In that arrangement, a gas-conducting communication may be provided between the preheating zone and the reaction zone; in that case, the hot solvent vapours passing from the reaction zone into the preheating zone form at least a part of the media used for preheating purposes; however, the two zones may also be separated from each other by a wall so that another gas such as hot air or the waste gases from the heating means for the tank or trough can be used as the heat carrier for the preheating zone. The first alternative is particularly important in the case of processes wherein the composite bodies are dipped into the heated solvent, while the second alternative is particularly significant in relation to processes in which operation is only carried out in the gas phase.

The treatment of small components which occur as waste such as computer scrap, track pads, smaller machine components and the like is preferably carried out in a shaft-like container into which the starting material is introduced from above, in the form of loose material, by way of a charging shaft, and the metals and the non-metallic components are discharged in the lower region. Larger and heavier components such as runner wheels, caterpillar track members, larger machine components and the like are preferably treated in a horizontally disposed apparatus in which the starting material passes through the individual zones or chambers in baskets.

The apparatus according to the invention is distinguished not only by its economical mode of operation but also by virtue of its versaility in regard to the charging material and the mode of operation employed. All substantial rubber-metal or plasticmetal metal compound materials which occur as waste can be used, while it is also possible to provide for continuous operation, batchwise operation or cyclic operation.

Figure 2:
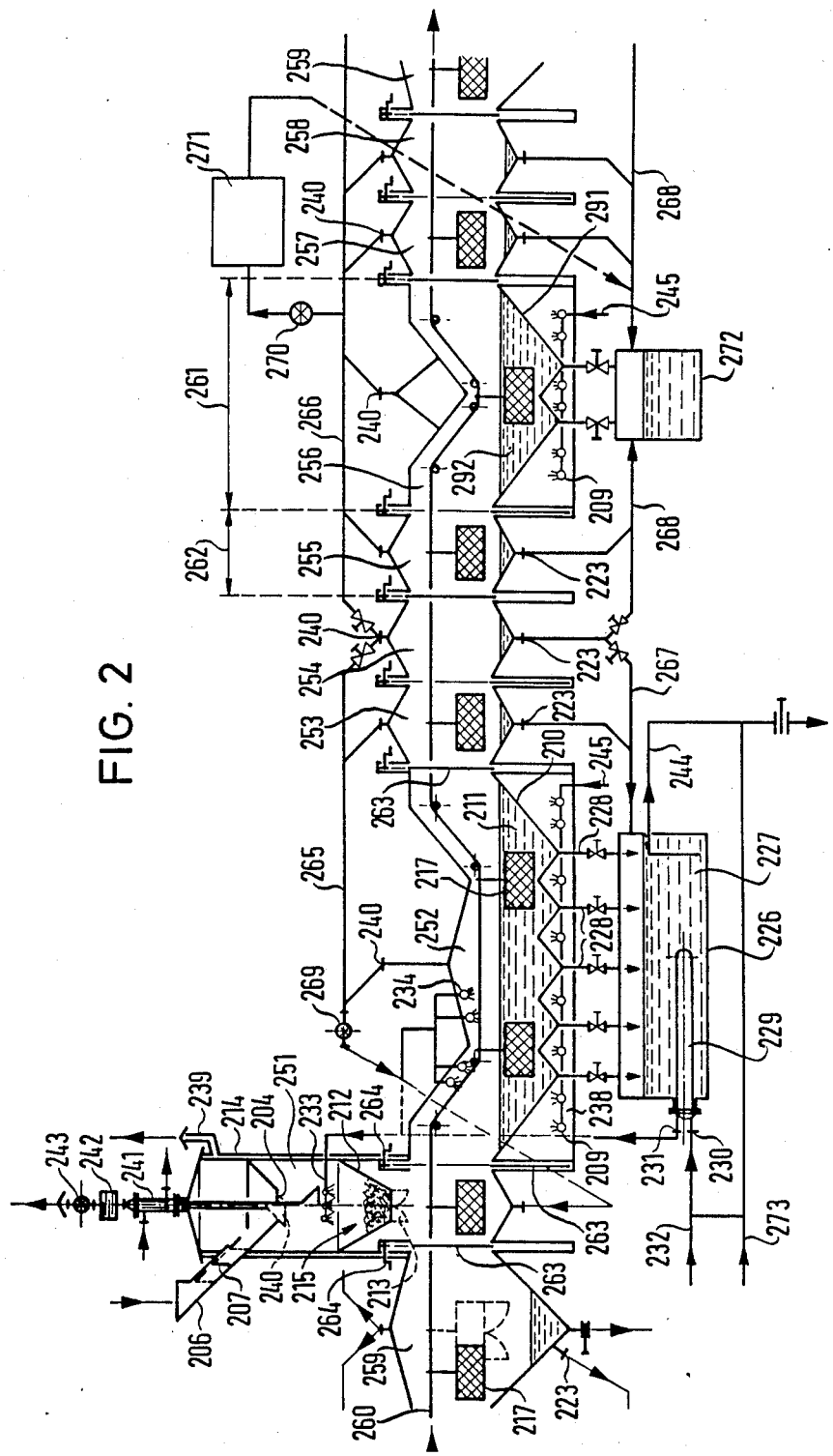
Figure 3:
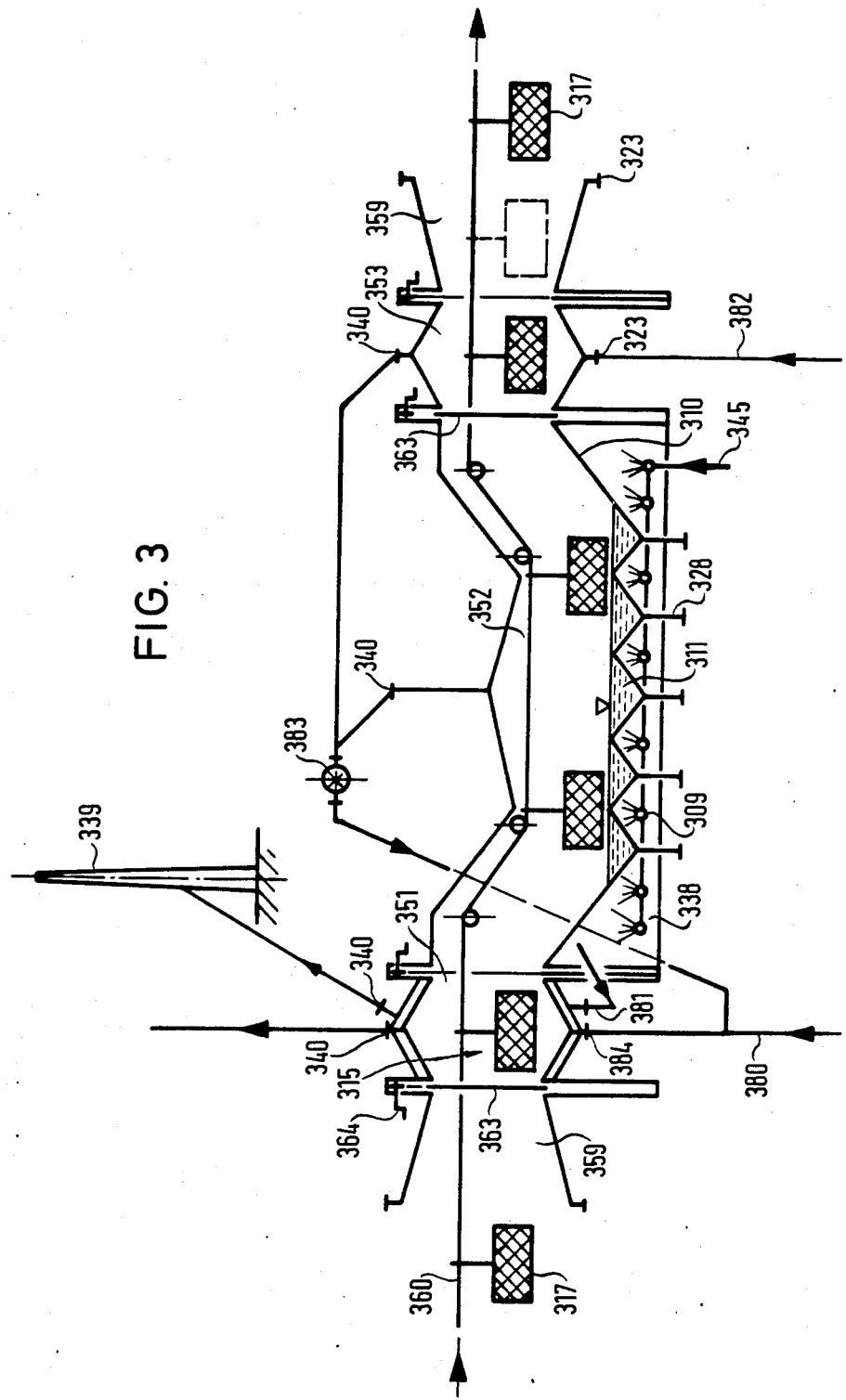

The invention will be described in greater detail by means of embodiments with reference to the three Figures of accompanying drawings wherein:

FIG. 1 shows an apparatus wherein the preheating zone and the reaction zone are arranged within a shaft-like container and which is particularly suitable for small components, FIG. 2 shows an apparatus wherein the preheating zone and the reaction zone are formed as chambers which are disposed one behind the other, and the composite bodies to be treated are conveyed by means of baskets along a substantially horizontal conveyor path, and FIG. 3 shows an apparatus which is similar to the apparatus shown in FIG. 2 for treating the composite bodies in the gaseous phase.

The apparatus illustrated in FIG. 1 includes a shaft-like container 1 which is of a double-walled construction and which is closed at its top by a cover 2. At its top, the container 1 has an intake opening 4 for the composite bodies to be treated; the opening 4 can be closed by a bell-type closure means 3. The closure means 3 is shown in the closed position in the left-hand half of the container and in the open position in the right-hand half, and serves not only for discharge of the gases or vapours from the container 1 but also for quantitative control of the amount of composite bodies introduced. Disposed above the closure means 3 is a storage chamber 5 to which the composite bodies to be treated can be fed by way of a charging hopper 6 which is formed as a charging control valve means, by virtue of flaps 7. Disposed in the lower region of the shaft-like container 1 is a closable outlet opening 8 for the metal members; the closure device for the opening 8 will be described hereinafter.

In its lower part, the container 1 includes a trough or tank 10 which can be heated by burners 9, for containing a liquid solvent 11 which at the same time represents the reaction zone.

Disposed in the middle region of the shaft-like container 1 is a gas-permeable intermediate floor 12 which has a closable opening 13 in its centre. In the illustrated embodiment, the container 1 is square or rectangular in cross-section, that is to say, it has four shaft walls 14, each of which is of a doublewalled configuration. The intermediate floor 12 extends downwardly in a funnel-like shape from the walls 14 towards the centre of the container, and has the closable opening 13 at its lowermost location. The intermediate floor 12 and the closure means of the opening 13 are formed from perforated plate or a wire grid, that is to say, in the present case they are both permeable to gas and also permeable to liquid. Above the intermediate floor 12 which is of a funnel-like configuration is a preheating zone 15 for the composite bodies 16 which are stored therein for a period of time.

Provided beneath the intermediate floor 12 is a basket 17 which can be dipped into the tank or trough and the walls of which, except for the portion 18 which closes off the outlet opening 8, are of such a nature as to be permeable to liquid. They may comprise for example perforated plate or sheet, a wire grid or a grating. In the illustrated embodiment, the basket 17 is mounted pivotably at the lower edge of the outlet opening 18 by means of a rotary hinge means 19, and is pivotable between a treatment position which is shown in solid lines, in which the basket dips into the tank or trough, and an emptying position which is shown in broken lines. The basket 17 has an inclined side wall 20 which is extended through the outlet opening 8 for the metal members and with which the basket is mounted by means of the rotary hinge 19 at the lower edge of the opening 8. In the treatment position, the portion 18 of the inclined side wall 20 closes off the outlet opening 8. In the illustrated embodiment, the opening 8 communicates with a closed removal chamber 22 which is formed by a cover 21 and which is provided with a flow discharge means 23 and a gravity or down pipe 25 which includes a control valve means 24.

Arranged beneath the shaft-like container 1 is a tank 26 for solvent 27 which has already been used. The tank 26 communicates both with the closable flow discharge 23 from the removal chamber 22 and also with a closable drain 28 of the tank 10. Disposed within the tank 26 is an indirect heat exchanger 29 having an inlet 30 and an outlet 31 for the solvent which is supplied by way of a conduit 32 and which is to be heated up by the heat exchanger 29. The outlet 31 of the heat exchanger 29 communicates by way of conduits with nozzles 33 to 35 which feed the solvent preheated in the heat exchanger to the preheating zone and to the reaction zone respectively, and provide the make-up for the solvent which has been consumed. The arrangement also includes nozzles 36 for the introduction of a cold solvent or additives.

As already mentioned, the walls 14 are of a double configuration. Disposed between the walls is an intermediate space 37 which communicates with the heating chamber 38 containing the burners 9, and serves as a smoke discharge. At the top, the space 37 communicates with a chimney 39. In that way, the hot flue gases can be utilised for heating the shaft-like container. For that purpose, the inner wall should be heat-conducting while the outer wall should be of an insulating nature.

At the top, or at any event above the preheating zone 15, the container 1 includes a gas outlet 40 which in the present case is formed by a bell-type closure means. Connected to the gas outlet 40 is a reflux condenser 41, a waste gas filter 42 and a suction extractor means 43. The cleaned, extracted gases are then passed into the open air.

Reference numeral 4 denotes an outlet from the tank 26 while reference numeral 45 denotes a feed conduit to the burners 9. As the viscose liquid 27 in the tank 26 which is used or also consumed, is combustible, the outlet 44 may communicate with the feed conduit 25 by way of a metering device.

The removal chamber 22 for the metal members also has a gas outlet 46 which communicates by way of a suction extractor device 47 with the space beneath the gas outlet 40 in the container 1.

The mode of operation of the process with the above-described apparatus will now be explained.

When the solvent bath 11 in the tank 10 has been adjusted to the desired temperature, for example 250° C., by the burners 9, the composite bodies which are introduced into the storage chamber 5 by way of the hopper 6 are conveyed into the preheating zone 15, in the desired quantity, by lowering the bell-type closure means 3. After the closure means 3 has been closed, the operating pressure is set for example at 0.7 bar. Due to the suction effect produced by the suction extractor means, the hot solvent vapours rise upwardly and in so doing flow through the material which is temporarily stored in the preheating zone 15. The hot vapours are cooled down by virtue of being in heat exchange relationship with the composite bodies to be treated, and the major proportion of the hot vapours is returned to a liquid condition by condensation. The residual amount of gas passes through the gas outlet 40 into the reflux condenser 41 where the major part thereof is condensed and returned in the liquid condition to the treatment chamber. The residue which has not condensed passes by way of the filter 42 into the open air.

When the composite bodies in the preheating zone 15 have reached a temperature of from 50° to 150° C., the bond between the metal and the non-metallic components is already substantially weaened, due to the effect of the solvent vapours. The opening 13 is now opened. The preheated composite bodies 16 drop into the basket 17 and are now exposed to the hot solvent bath 11. The non-metallic material is separated and dissolved within a short period of time. When that process is concluded, the basket 17 is moved from the treatment position into the upwardly pivoted emptying position so that the metal members in the basket, from which the rubber or plastic material has been removed, pass into the down pipe 25 by way of the inclined wall 20. As the inclined wall 20, with the exception of the portion 18, is perforated, the liquid which is entrained from the solvent bath 11 partially flows away during the above-indicated composite body transportation step, and can be removed by way of the drain 23.

The amount of solvent which is consumed during the process is replaced by the metered addition of fresh solvent by way of the nozzles 33 to 36 so that the level of the liquid bath in the basket 17 is kept constant. The viscose liquid which is produced from the dissolved rubber and/or plastic material and the solvent which has not been consumed may be partially or entirely drained into the tank 26 by way of the drain 28 from the tank 10, and can be replaced by fresh unconsumed solvent by way of the sprinklers or sprays, or by way of a direct feed (not shown) to the tank 10.

During the process of dissolving the preheated composite bodies which are introduced into the basket 17, the next charge is already undergoing preheating in the preheating zone 15; the next charge had been introduced under quantitatively controlled conditions into the preheating zone directly after the previous charge had been discharged from the preheating zone and after closure of the opening 13, by way of the bell-type closure means 3.

It should also be noted that the feed of fresh solvent by way of the nozzles 33 makes it possible for the process for dissolving the non-metallic components already to be started in the preheating zone as an adequate supply of solvent at that location can make it possible for the composite bodies to be completely wetted with the liquid solvent.

While the above-described apparatus as shown in FIG. 1 is intended in particular for separating and dissolving the non-metallic components of smaller-size composite bodies comprising metal and rubber or plastic material, the apparatus shown in FIG. 2, which will now be described, is primarily intended for larger composite bodies. In describing the FIG. 2 apparatus, the reference numerals used to denote the members corresponding to those of the apparatus shown in FIG. 1 correspond to the reference numerals used in FIG. 1, but with the addition of 200. That means that there is no need for a detailed description of the respective components and the mode of operation thereof.

In the embodiment illustrated in FIG. 2, a plurality of adjoining chambers 251 to 259 are arranged in a closed annular configuration which is shown in a developed form in FIG. 2. Part of the chamber 259 is shown at the end of the developed view while part is shown at the beginning thereof. For reasons of space, the annular configuration is desirably oval.

Baskets 217 can be transported through the chambers by means of an endless conveyor cable 260. The bottoms and/or walls of the baskets 217 are permeable to gas and liquid. In order to ensure that, along the path of conveying movement of the baskets 217, the baskets may be stopped from time to time within a chamber, the dimensions of the chambers along the path of conveying movement of the baskets 217 correspond to a unit measurement or an integral multiple thereof, and the baskets are also secured to the conveyor cable 260 at a spacing corresponding to the unit measurement or an integral multiple thereof. In the present case, the dimensions of the chambers 251, 253 through 255 as well as 257 and 258 along the conveyor path correspond to the unit measurement, those of the chambers 256 and 259 correspond to double the unit measurement and those of the chamber 252 correspond to treble the unit measurement. It should be emphasised at this point that the path of conveying movement of the baskets 217 is the crucial or controlling aspect so that for example in relation to the chamber 256, because the path of conveying movement goes down, the longitudinal dimension 261 thereof is somewhat shorter than double the longitudinal dimension 262 of the chamber 255 which represents the measurement unit.

Provided between the individual chambers are walls 263 which can be moved between a closed position and a position of opening the path of conveying movement, by means of individual drives 264. The wall 263 at the intake side of the chamber 251 is shown in the closed position while that at the exit side of the chamber 251 which at the same time corresponds to the intake side of the chamber 252 is illustrated in the position of freeing the path of conveying movement. By virtue of the provision of the displaceable walls 263, it is possible on the one hand for two adjacent chambers to be separated from each other while on the other hand it is possible for the conveyor baskets 217 to be further transported along the path of conveying movement from one chamber to the next or to the next-but-one chamber.

Each of the chambers has a gas outlet 240 in the upper region. Drains 223 are also associated with the individual chambers. The gas outlets of the chambers 252 and 253 are connected to a gas conduit 265 while the outlets 240 of the chambers 255 through 259 are connected to a gas conduit 266. The drain of the chamber 253 communicates with a return flow conduit 267 while the drains of the chambers 255 through 259 communicate with return conduits 268. The gas outlet 240 of the chamber 254 can be connected by valves selectively to the gas conduit 265 and the gas conduit 266 and the drain 223 of that chamber can be selectively connected to the return flow conduit 267 and the return flow conduit 268. The gas conduit 265 leads to the chamber 251 by way of a suction extractor means 269 while the gas conduit 266 leads by way of a suction extractor device 270 and a device 271 for recovering the cleaning agent from the vapours which are drawn off, into a storage means 272 for the cleaning agent. The return flow conduit 267 leads into the tank 226 for consumed solvent and the return flow conduit 268 leads into the cleaning agent tank 272.

In the embodiment illustrated in FIG. 2, the preheating zone 215 is arranged in the chamber 251 and the tank 210 containing the solvent bath 211 is disposed in the chamber 252. Therefore, in this embodiment, the preheating zone 215 is disposed beside the tank and can be separated therefrom by the wall 263 between the chambers. In the present case, the path of conveying movement is lowered within the chamber 252 so that the baskets 217 can dip into the solvent bath 211.

The chamber 253 serves as a lock and drip zone, the chamber 254 serves as a buffer zone, the chamber 255 serves as a lock and preheating zone for a cleaning bath, the chamber 256 serves as a cleaning zone, the chamber 257 serves as a lock and drip zone, the chamber 258 serves as a buffer zone and the chamber 259 serves as a removal zone and possibly as a charging zone.

Like the chamber 252, the chamber 256 which serves for cleaning the metal members from which the non-metallic components have been removed includes a trough or tank 291 which is heated by burners 209, with a cleaning liquid 292, for example trichloroethylene.

The chambers 254 and 259 which act as buffer zones are provided in order to prevent mixing of solvent and cleaning agent (buffer zone of the chamber 254 which can be selectively connected to the solvent circuit and to the cleaning agent circuit, and in order to prevent solvent vapours from being discharged into the chamber 259 which is provided at the removal zone.

The mode of operation of the apparatus shown in FIG. 2 will now be described. In this connection, it is assumed that the apparatus has already been operating for some time and that the baskets assume the illustrated positions.

As in the case of the apparatus illustrated in FIG. 1, the composite bodies to be treated are loaded into the shaft-like container 214 through the hopper 206 and introduced in quantitatively controlled fashion through the bell-type closure means 204 into the preheating zone 215 in which they are preheated by the hot vapours of the solvent 211 which is heated in the tank 210. During the preheating process, the basket 217 which is in the chamber 259 is unloaded at the side, that is to say, the metal members from which the nonmetallic components have been removed and which have been cleaned are removed from the basket. During the preheating process, disposed in the chamber 251 beneath the funnel-like separating wall structure 212 is an empty basket 217 which, after the conclusion of the preheating process, is charged with the preheated material by the opening 213 of the separating wall structure 212 being opened. During the above-described period, the separating walls 263 between the chambers are in the illustrated position. In the next working cycle, the baskets 217 are advanced by one position (towards the right in the drawing) by the conveyor cable 260. When that is done, the path of conveying movement of the baskets is cleared by downward movement of the respective separating walls between the chambers, in good time before a basket changes over into the next following chamber. In that way, the baskets are moved stepwise along the conveyor path, and subjected to treatment. The preheating operation is carried out in the chamber 251, the steps of separating and dissolving the non-metallic components are performed in the chamber 252 by the members being dipped into the hot solvent bath 211, the solvent liquid can drip off in the chamber 253, preheating is effected by the vapours of the cleaning liquid 272 in the chamber 255, the metallic members are cleaned in the chamber 256, the cleaning liquid can drip off in the chamber 257 and the cleaned metal members, as already described, are removed laterally manually or by a suitable piece of equipment, in the chamber 259.

The chamber 254 which acts as a buffer zone is connected in the illustrated position to the solvent circuit. When the basket which is just in the chamber 253 has been advanced by half a step into the chamber 254, then the walls 263 between the chambers 252 and 256 are moved into the opposite position to the position illustrated, and thus the chamber 254 which serves as the buffer zone is separated from the chamber 253 which serves as the lock arrangement. Thereafter, the gas outlet 240 and the drain 223 of the chamber 254 are switched over from the solvent circuit to the cleaning agent circuit. When the respective basket has reached the chamber 255 after the next half step, the chamber 255 is closed again at its intake side and opened at its exit side, by virtue of the walls 263, in order to be able to be exposed to the effect of the hot vapours of the cleaning agent. The chamber 258 which serves as a buffer zone operates in a similar fashion.

Instead of the composite bodies to be treated being charged into the apparatus through the hopper 206, or in addition thereto, it is also possible to provide for charging in the chamber 259 after the cleaned metal members have been removed. That mode of charging the apparatus is to be preferred in particular when dealing with heavy and larger members.

In the case of the apparatus shown in FIG. 3, components which correspond to those of the apparatus shown in FIG. 2 are identified by reference numerals which are increased by 100 in comparison with the reference numerals used to denote the respective corresponding components in FIG. 2. The apparatus illustrated in FIG. 3 essentially corresponds to a part of the apparatus shown in FIG. 2, with the composite bodies only being treated in the gaseous phase of the solvent. For that purpose, the level of the solvent bath in the trough or tank 310 is lowered to such a degree that the baskets 317 no longer dip into the bath. As the non-metallic components of the composite bodies cannot be dissolved away in the gaseous phase, the FIG. 3 apparatus also lacks the cleaning bath of the apparatus shown in FIG. 2. In this case, the separation of the non-metallic components from the metallic components is advantageously effected mechanically after emptying of the baskets 317 in the removal position.

The composite bodies to be treated are preheated in the preheating zone at 315 primarily by hot air which is supplied by way of a conduit 380 or by hot waste gases from the heating chamber 338, which are supplied by way of a conduit 381. The vapours which are drawn off from the chambers 352 and 353 may also be admixed with the hot air. By virtue of the displaceable walls 363, the chamber 351 containing the preheating zone 315 may be separated from the chamber 352 which contains the solvent bath 311, and the preheating operation may be effected solely by means of hot air or by means of the hot waste gases from the heating chamber 338. However, it is also possible for the hot vapours of the solvent to be passed directly from the chamber 252 into the chamber 315. In the present embodiment, the chamber 353 is also formed as a cooling zone. Cooling air is passed into the chamber by way of the conduit 382. In this embodiment, the gas outlets 340 of the chambers 352 and 353 commmunicate by way of a suction extractor means 383 with the inlet 384 for the hot air, while the gas outlets 340 of the chamber 351 lead selectively to a reflux condenser (not shown) or into the chimney.

As in the case of the embodiments described above, the make-up feed for the solvent bath 311 may be by way of nozzles or by feed conduits. Moreover, the ancillary items of equipment which are described above with reference to FIGS. 1 and 2, such as tank and so forth, may also be included. It is also possible for consumed solvent to be used for the make-up of the solvent bath, if the consumed solvent is supplemented by suitable additives. That possibility is indicated in the case of the apparatus shown in FIG. 2 by virtue of the drain conduit 244 being taken back into the inlet 230; communicating with the return conduit is a conduit 273 for adding the appropriate additives for regenerating the solvent.

We claim:

1. In a method for the removal of a material selected from the group consisting of rubber, plastic and mixtures thereof, from composite bodies of metal and at least one of said materials, in which the composite body is placed in a reaction vessel, there exposed to the hot vapors of a heated, liquid solvent and, after the dissolutin of the material to be removed, the metal parts are removed from the reaction container, the improvement comprising passing the composite bodies through a first lock into a preheating zone of the reaction vessel, exposing said bodies in said preheating zone to be hot vapors of a solvent for said rubber or plastic material at an absolute gas pressure in the range of 0.5 to 4.0 bar and at a temperature between 50° and 150° C., then immersing said composite bodies in said solvent heated at a temperature of 150° to 550° C. and, after the dissolution of said rubber or plastic material, removing the metal parts from the reation container through a second lock.

2. In a method for the removal of a material selected from the group consisting of rubber, plastic or mixtures thereof, from composite bodies of metal and at least one of said materials, in which the composite bodies are placed in a reaction vessel, there exposed to the hot vapors of a solvent and, after the dissolution of the material to be removed, the metal parts are removed from the reaction vessel, the improvement comprising passing the composite bodies through a first lock into a preheating zone heated by hot gases to a temperature between 50° and 150° C., then exposing said bodies to the hot vapors of a solvent for said rubber or plastic material heated at a temperature of 150° to 550° C. and at an absolute gas pressure in the range from 0.5 to 4.0 bar (absolute), and, after the dissolution of said rubber or plastic material, removing the metal parts from the reaction container through a second lock.

3. A method according to claim 1 or claim 2, wherein the metal parts are immersed in a cleaning bath after removal from the reaction container.

4. A method according to claim 1, wherein said solvent is selected from the group consisting of mineral oils and trichloroethylene.

* * * * *